United States Patent Office 3,282,158
Patented Nov. 1, 1966

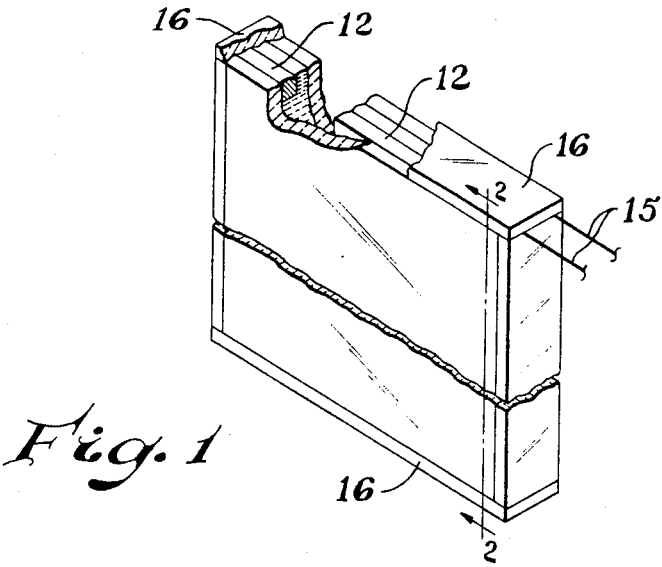
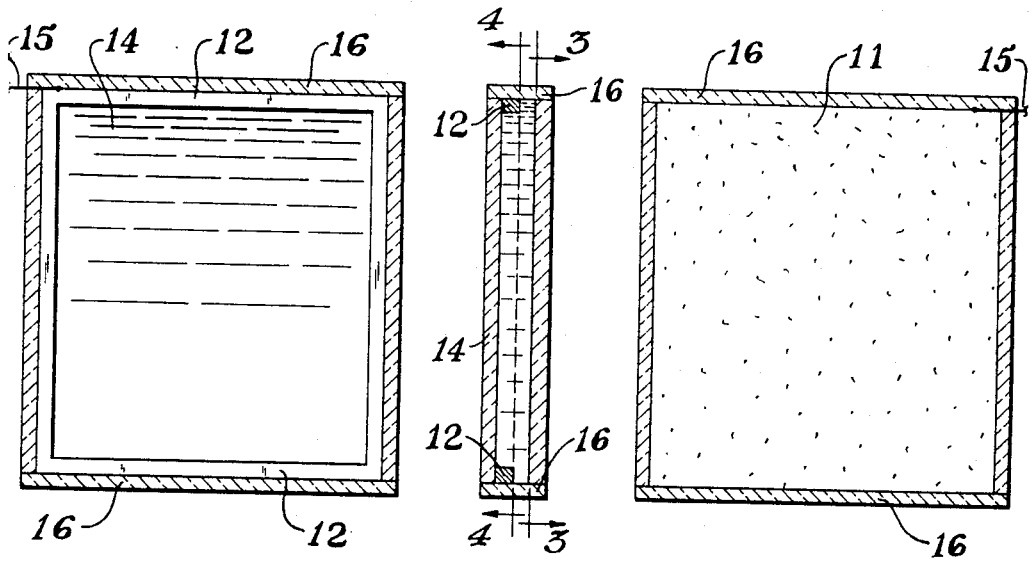
INVENTORS.
Giffin D. Jones
Ralph E. Friedrich
BY Griswold & Burdick
ATTORNEYS

---

3,282,158
COLOR REVERSIBLE ELECTROCHEMICAL LIGHT FILTER UTILIZING ELECTROLYTIC SOLUTION
Giffin D. Jones and Ralph E. Friedrich, Midland, Mich., assignors to The Dow Chemical Company, Midland, Mich., a corporation of Delaware
Filed Jan. 7, 1963, Ser. No. 249,859
4 Claims. (Cl. 88—107)

This invention relates to an improved electrochemical, substantially transparent, light filter the color of which may be reversibly altered upon the appropriate application of electric current.

Tinted or colored glass has found wide acceptance and applicability. It is useful in situations where direct sun or other light is harmful or undesirable. In such situations the tinted or colored glass may filter out a portion of the light or simply reduce its intensity. Usually, the incident light is undesirably intense only during certain periods of the day. In this situation, it is desirable that the glass be clear or nearly clear or least a part of the time. Eastern exposure windows, for example, would desirably be tinted in the morning and clear during the afternoon. For western exposure windows, of course, the reverse could be true.

Numerous attempts have been made to provide light filters of variable absorption. One such attempt is disclosed in U.S. Patent 2,710,274. That patent discloses a method wherein a substantially transparent sandwich of two outside layers of glass and a middle layer of a material whose transparency changes with luminous intensity and/or temperature. These filters have the apparent disadvantage of being dependent on luminous intensity and/or temperature and, to that extent, are not subject to positive control of light transmission.

Other proposed methods of providing a variable intensity light filter include (as suggested in U.S. Patent 2,953,819) the orientation of small particles contained in a liquid by means of an electric field, thereby altering the transmission of light through the liquid. A method is suggested in British Patent 328,017 wherein a clear solution is caused to develop a color as long as electric current is passed therethrough, the color disappearing and the solution clarifying immediately upon termination of the current. Similarly, in U.S. Patent 2,632,045, an electrochemical color filter is suggested in which the intensity of the color is proportional to the voltage applied thereto. As the potential is decreased, the solution in the filter reverts to its original (usually clear) state.

None of the above methods succeed in a color change which will remain as long as desired without the continuous application of current to the solution in the filter.

We have discovered an electrochemical light filter, the color of which may be reversibly altered and, once formed, will remain over a substantial period of time without further application of electric current thereto.

A better understanding of the present invention together with its attendant objects and advantages will be facilitated by the following specification when taken in conjunction with the accompanying drawings in which:

FIGURE 1 is an isometric view partially in section of one embodiment of the filter of the present invention.

FIGURE 2 is a sectioned plan view of the filter of the present invention.

FIGURE 3 is a sectional view of the filter of the present invention which illustrates in more detail the transparent gross electrode.

FIGURE 4 is a sectional view of the filter of the present invention which illustrates in more detail the minor electrode.

In the embodiment illustrated in the drawings, one major internal surface 11 of the filter is treated so as to make a major portion of that side electrically conductive without destroying transparency. A relatively small, inert conductive electrode surface 12 is provided within the filter. In the embodiment illustrated, the electrode surface 12 is in the form of a peripheral strip around the outer edge of major internal surface 14 of the filter. Other configurations are, of course, possible and may also be desirable. Each electrode is provided with means, such as wires 15, to connect an external source of direct current. Sealing means 16 is generally employed to protect the solution from contact with air and to prevent spillage in handling or use.

The filter may be constructed of glass, suitable plastics or any other substantially transparent material which is impervious to the aqueous solution to be retained within the body of the filter. Desirably the transparent material has characteristics which will permit its use as a structural member as, for example, in interior or exterior window glass fixtures.

Ordinarily, the transparent gross electrode will preferably cover the entire surface of one major internal surface of the filter. Suitable materials for forming this transparent electrode are stannic or indium oxide, a light metallized coating or a metallic screen of particles sufficiently small that substantial transparency is maintained. The minor, preferably inert, electrode need not be transparent. Silver, platinum, chromium, nickel, tungsten, calomel, or wires coated with these materials or the like may be used, depending on the solution to be contained in the article.

Appropriate aqueous, light transmitting solutions for use in the filter of the present invention are those containing complexed ions of copper. Other ions permissible in the aqueous solutions useful in the filter of the present invention are those which do not form precipitates with the complexed copper ions or other ions present, and are not readily oxidized or reduced. Examples of other ions permissible in the aqueous solution are: sodium, lithium, potassium, ammonium, hydrogen, magnesium, acetate, chloride, sulfate, nitrate, and the like which exhibit the requisite characteristics outlined above.

Suitable complexing materials for use in the present invention are those which render the copper ion stable in aqueous solution in a valence state of $+1$ or $+2$. Chloride ion, ammonia, lower molecular weight primary amines, and the like which are known to solubilize monovalent copper are appropriate.

Usually an amount of copper ion from about 0.01 percent by weight of solution up to the solubility limit of copper in aqueous solution is appropriate. Lower amounts may be used, but limited color visibility may be encountered. An amount of complexing agent at least sufficient to complex all the copper ion present should be employed, usually at least twenty percent and preferably at least 100 percent excess.

Voltage applied between the electrodes should be sufficient to cause current flow, but should be below the gassing limit of the particular cell used. The electrode-electrolyte voltage should be below the accepted decomposition potential (about 2.2 volts). Total voltage applied to the electrodes will, of course, take into account the conductivity of the electrolyte solution and the cell geometry. For instance, if the voltage drop across the electrolyte in the particular cell to be used were one volt, and three volts were applied between electrodes, the electrode-electrolyte voltage would be two volts and thus below the 2.2 volt gassing limit.

In some instances it may be desirable to mix into the solution a freezing point depressant. Further, in some applications the addition of a gelling agent may be desirable, mainly to prevent leakage. None of these are essential. The use of these additives, such as an antifreeze or a gelling agent, should be considered in light of the particular metal-containing ions contained in the solution. Some alcohols may react with the ion in solution and would thus be undesirable. Tertiary alcohols, however, and particularly tertiarybutyl alcohol, as well as known inorganic freezing point depressants are generally useful as anti-freeze additives in the present invention.

A wide variety of gelling agents such as sulfonated polyvinyl aromatics, polymers of sulfonated aromatic monomers, polyvinyl trimethylammonium chloride, hydrolyzed polyisopropenyl acetate, or the like may also be employed, if desired.

Maximum color stability may be obtained by protecting the solution from contact with air. When the solution is so-protected, color formed by the passage of current through the solution will usually remain for at least several hours or until a current is passed through the solution in the reverse direction.

The present invention may be more readily understood in light of the following examples which are set forth to illustrate, and are not to be construed to limit, this invention.

*Example 1*

A glass cell was constructed substantially as hereinbefore described having a one inch square transparent gross electrode of glass coated with tin oxide and a minor electrode of silver.

An aqueous solution was prepared by dissolving one percent by weight of cuprous chloride in one normal hydrochloric acid. The solution was used to fill the cell and the cell was sealed.

With the large electrode anodic current at a voltage of about 1.5 volts was passed through the solution whereby a blue color was formed. After a period of about an hour at no current flow the blue color did not change and the polarity of the cell was reversed. Reversal of current flow caused the original light green color to appear and this color was also stable.

*Example 2*

An aqueous solution containing about one percent by weight of cuprous chloride in concentrated aqueous ammonia was prepared and used to fill the cell of Example 1.

Passage of current through the cell gave substantially the same results outlined in Example 1. With the gross electrode anodic, a blue color was formed and upon reversal of current flow the original light green color returned.

*Example 3*

Lower molecular weight primary amines such as methyl amine, ethyl amine and the like may be employed as complexing agents in place of the chloride ion and ammonia of Examples 1 and 2 with substantially similar results.

Various modifications may be made in the present invention and it is to be understood that we limit ourselves only as defined in the appended claims.

We claim:
1. In an electrochemical light filter having a transparent gross electrode, a minor electrode in spaced relationship to the gross electrode and which is spaced and positioned to allow the passage of light, a light transmitting electrolyte occupying the space between said electrodes, an electrical power source and means for reversibly applying such electrical power to the electrodes, the improvement which comprises providing as said electrolyte an aqueous solution containing a coloring amount of complexed copper ion stable in aqueous solution in the $+1$ and $+2$ valence state whereby the color of the aqueous solution is altered by sequentially applying pulses of electrical power of opposite polarity.

2. The electrochemical light filter of claim 1 wherein the amount of complexed copper ion is from about 0.01 percent by weight of solution up to the solubility limit of the copper ion in the aqueous solution.

3. The electrochemical light filter of claim 1 wherein the complexing agent is the chloride ion.

4. The electrochemical light filter of claim 1 wherein the complexing agent is ammonia.

References Cited by the Examiner

UNITED STATES PATENTS

| | | | |
|---|---|---|---|
| 2,632,045 | 3/1953 | Sziklai | 88—107 X |
| 2,710,274 | 6/1955 | Kuehl. | |
| 2,953,819 | 9/1960 | Holoubek et al. | 106—291 X |

FOREIGN PATENTS 328,017  4/1930  Great Britain.

DAVID H. RUBIN, *Primary Examiner.*

J. G. BOLTEN, *Assistant Examiner.*